(12) United States Patent
Kim et al.

(10) Patent No.: US 11,965,684 B2
(45) Date of Patent: Apr. 23, 2024

(54) INVERTER MODULE AND ELECTRIC COMPRESSOR COMPRISING SAME

(71) Applicant: Hanon Systems, Daejeon (KR)

(72) Inventors: Tae Hyeong Kim, Daejeon (KR); Eun Seok Kang, Daejeon (KR); Sung Jun Park, Daejeon (KR); Chan Song, Daejeon (KR); Seung Hwan Shin, Daejeon (KR); Ho Bin Im, Daejeon (KR); Min Gyo Jung, Daejeon (KR)

(73) Assignee: Hanon Systems, Daejeon (KR)

( * ) Notice: Subject to any disclaimer, the term of this patent is extended or adjusted under 35 U.S.C. 154(b) by 461 days.

(21) Appl. No.: 17/286,732

(22) PCT Filed: Oct. 18, 2019

(86) PCT No.: PCT/KR2019/013710
§ 371 (c)(1),
(2) Date: Apr. 19, 2021

(87) PCT Pub. No.: WO2020/080869
PCT Pub. Date: Apr. 23, 2020

(65) Prior Publication Data
US 2021/0381737 A1    Dec. 9, 2021

(30) Foreign Application Priority Data

Oct. 19, 2018   (KR) .................. 10-2018-0125391
Oct. 10, 2019   (KR) .................. 10-2019-0125390

(51) Int. Cl.
*F25B 49/02*    (2006.01)
*H02M 1/084*    (2006.01)
*H02M 7/537*    (2006.01)

(52) U.S. Cl.
CPC .......... *F25B 49/022* (2013.01); *H02M 1/084* (2013.01); *H02M 7/537* (2013.01); *F25B 2600/021* (2013.01)

(58) Field of Classification Search
CPC . F25B 49/022; F25B 2600/021; H02M 1/084; H02M 7/537
See application file for complete search history.

(56) References Cited

U.S. PATENT DOCUMENTS 7,592,783 B1 *   9/2009   Jarvinen ................. H02N 1/04
                                                     290/1 R
2009/0309643 A1 * 12/2009  Suzuki ................ H02M 7/5387
                                                     327/276
(Continued)

FOREIGN PATENT DOCUMENTS

JP    2012-065431 A    3/2012
JP    2013255297 A    12/2013
(Continued)

OTHER PUBLICATIONS

Office Action dated May 30, 2022 by the JPO in the corresponding Patent Application No. 2021-520970, with English translation.
(Continued)

*Primary Examiner* — Henry T Crenshaw
(74) *Attorney, Agent, or Firm* — Norton Rose Fulbright US LLP; James R. Crawford

(57) ABSTRACT

An inverter module according to an embodiment of the present invention comprises: a high voltage circuit unit which generates an inverter control voltage and a motor driving voltage by using a first DC voltage; a high voltage circuit pattern which electrically connects the high voltage circuit unit; a low voltage circuit unit which communicates with an external device by using a second DC voltage having a smaller magnitude than the first DC voltage; and a low voltage circuit pattern which electrically connects the low (Continued)

voltage circuit unit. The high voltage circuit pattern and the low voltage circuit pattern are spaced apart from each other.

18 Claims, 5 Drawing Sheets

(56) References Cited

U.S. PATENT DOCUMENTS

| | | | |
|---|---|---|---|
| 2011/0012553 A1* | 1/2011 | Sloan | B60K 6/365 320/105 |
| 2011/0141829 A1* | 6/2011 | Ware | G11C 7/02 327/295 |
| 2011/0215639 A1* | 9/2011 | Kurosaki | H04B 10/802 307/9.1 |
| 2018/0076718 A1 | 3/2018 | Zeng et al. | |

FOREIGN PATENT DOCUMENTS

| | | | |
|---|---|---|---|
| JP | 2014-033531 A | | 2/2014 |
| JP | 2016-181989 A | | 10/2016 |
| JP | 6012915 B1 | | 10/2016 |
| JP | 2016178846 A | | 10/2016 |
| JP | 2016181989 | * | 10/2016 |
| KR | 10-2015-0108165 A | | 9/2015 |
| KR | 20170040068 A | | 4/2017 |

OTHER PUBLICATIONS

Office Action dated Jan. 8, 2024, by the Korean Patent Office in the corresponding patent application KR 10-2019-0125390, with English translation.

* cited by examiner

INVERTER MODULE AND ELECTRIC COMPRESSOR COMPRISING SAME

This application is a national phase under 35 U.S.C. § 371 of International Application No. PCT/KR2019/013710 filed Oct. 18, 2019, which claims the benefit of priority from Korean Patent Application Nos. 10-2019-0125390 filed on Oct. 10, 2019 and 10-2018-0125391 filed on Oct. 19, 2018. The entire contents of these applications are incorporated herein by reference in their entirety.

TECHNICAL FIELD

An embodiment relates to an inverter module and an electric compressor including the same.

BACKGROUND ART

An inverter is a power conversion device which can control a motor by receiving alternating current (AC) common power and converting the AC common power to direct current (DC) common power and then converting the DC common power back to the AC common power for motor control. The inverter is used in various forms throughout the industry such as fans, pumps, elevators, transfer devices, and production lines. In a general power conversion principle of a general-purpose inverter for motor driving, 3-phase AC common power is received and then converted to DC common power through a rectifier circuit, and the DC common power is stored in a DC-link capacitor and then converted to the AC common power through the inverter.

This inverter module can be largely divided into a high voltage part and a low voltage part. The high voltage part is composed of elements for operation power of a main integrated circuit (IC) and motor operation power, and the low voltage part, which is driven by a voltage of approximately 12 V, is composed of communication elements for controller area network (CAN) communication with a vehicle. Power semiconductor switch elements mainly used in the high voltage part include an insulated gate bipolar transistor (IGBT), a metal oxide silicon field effect transistor (MOSFET), and the like. The IGBT can operate in a voltage range of 300 V or higher and is suitable for high-efficiency and high-speed power systems.

FIG. 1 is a view illustrating an example of an inverter module.

The inverter module shown in FIG. 1 is implemented in a form in which a high voltage circuit pattern 20 which electrically connects high voltage circuit units 12 and 13 and a low voltage circuit pattern 40 which electrically connects low voltage circuit units 31 and 32 cross each other. Accordingly, since noise coupling occurs between the high voltage circuit pattern 20 and the low voltage circuit pattern 40 due to conducted emission (CE), a problem in that electromagnetic compatibility (EMC) is degraded can occur.

Further, since a separation interval between a low voltage connector 31 and a low voltage circuit part 32 among the low voltage circuit units increases, a problem in that the electromagnetic compatibility is degraded can occur.

In addition, since portions which are not electrically connected among the elements 12 using a 15 [V] voltage and the elements 13 using a 3.3 [V] voltage among the high voltage circuit units become closer to each other, a problem in that noise coupling occurs between the elements 12 using the 15 [V] voltage and the elements 13 using the 3.3 [V] voltage, and thus the electromagnetic compatibility is degraded can occur.

A technology behind the present invention is disclosed in Korean Laid-Open Patent No. 10-2015-0108165 (published on Sep. 25, 2015).

DISCLOSURE

Technical Problem

An embodiment is directed to providing an inverter module capable of reducing noise coupling which occurs between a high voltage part and a low voltage part thereof.

Problems to be solved by the present invention are not limited to the above-described problems, and purposes and effects understood from the solutions and embodiments which will be described below are also included.

Technical Solution

An inverter module according to an embodiment of the present invention includes: a high voltage circuit unit configured to generate an inverter control voltage and a motor driving voltage using a first direct current (DC) voltage; a high voltage circuit pattern configured to electrically connect the high voltage circuit unit; a low voltage circuit unit configured to communicate with an external device using a second DC voltage having a smaller magnitude than the first DC voltage; and a low voltage circuit pattern configured to electrically connect the low voltage circuit unit, wherein the high voltage circuit pattern and the low voltage circuit pattern are disposed to be spaced apart from each other.

The high voltage circuit pattern and the low voltage circuit pattern may be printed on a board, and a region where the high voltage circuit pattern is printed and a region where the low voltage circuit pattern is printed may be separated from each other on the board.

The high voltage circuit unit may include a first circuit part driven through the first DC voltage, a second circuit part driven through a third DC voltage having a smaller magnitude than the first DC voltage, and a third circuit part driven through a fourth DC voltage having a smaller magnitude than the third DC voltage.

The first circuit part may include a first switching mode power supply (SMPS) configured to generate the third DC voltage through the first DC voltage, and a plurality of switching elements configured to convert the first DC voltage to the motor driving voltage through switching driving.

The second circuit part may include a second SMPS configured to generate the fourth DC voltage through the third DC voltage, and a gate driver configured to control the plurality of switching elements through the third DC voltage.

The first circuit part may include a processor configured to control the gate driver through the fourth DC voltage and communicate with the low voltage circuit unit.

The first circuit part, the second circuit part, and the third circuit part may be disposed on the high voltage circuit pattern.

The first circuit part, the second circuit part, and the third circuit part may be sequentially disposed depending on a current direction during inverter driving.

A plurality of elements constituting the second circuit part may be sequentially disposed along a first direction, and a plurality of elements constituting the third circuit part may be sequentially disposed along a second direction forming a predetermined angle with the first direction.

The plurality of elements constituting the third circuit part may be sequentially disposed to become farther away from the second circuit part along the second direction.

The low voltage circuit unit may include a connector part configured to receive the second DC voltage, and a fourth circuit part configured to communicate with the external device through the second DC voltage.

The connector part and the fourth circuit part may be disposed on the low voltage circuit pattern.

The connector part and the fourth circuit part may be disposed to be spaced apart from each other, and the high voltage circuit pattern may be disposed not to cross between the connector part and the fourth circuit part.

The inverter module may further include a transceiver configured to transmit a signal between the high voltage circuit unit and the low voltage circuit unit.

The transceiver may include an insulating element configured to insulate the high voltage circuit unit and the low voltage circuit unit.

An electric compressor according to an embodiment of the present invention includes the above-described inverter module.

Advantageous Effects

According to an embodiment, electromagnetic compatibility of an inverter module can be increased.

Various useful advantages and effects of the present invention are not limited to the above and can be relatively easily understood in a process of describing exemplary embodiments of the present invention.

MODES OF THE INVENTION

Figure 1:
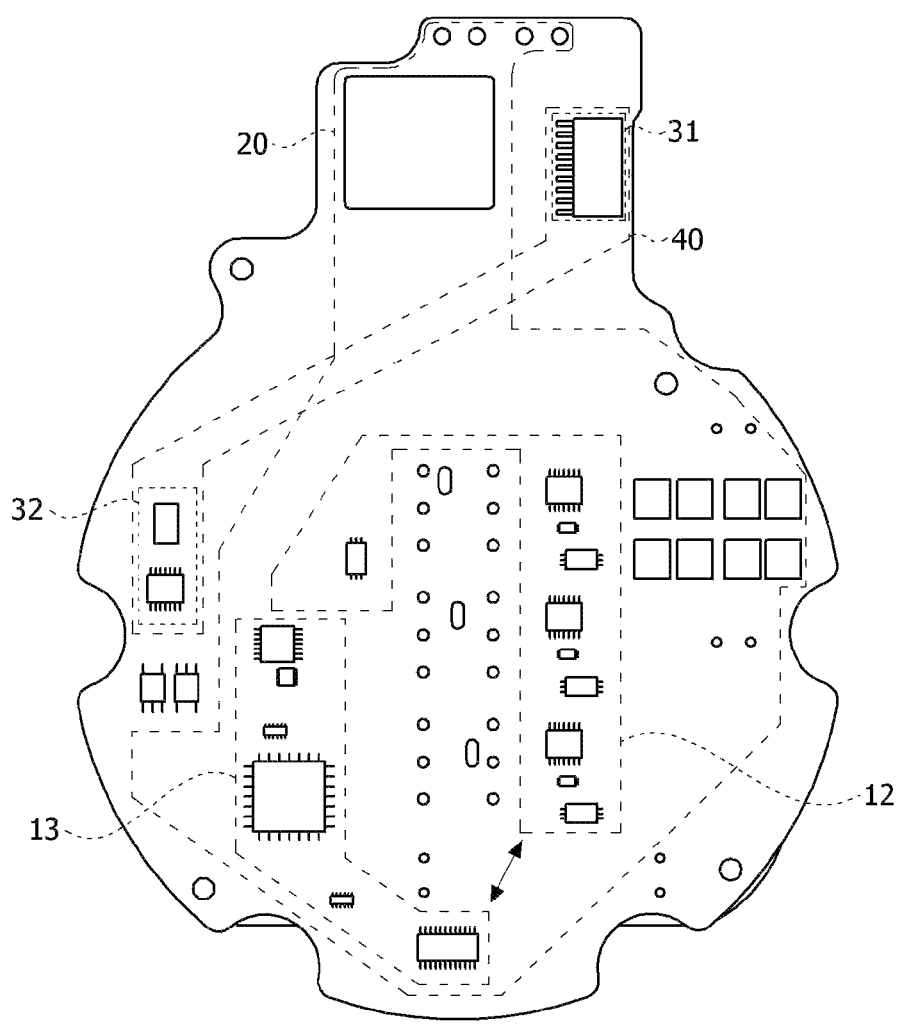
FIG. 1 is a view illustrating an example of an inverter module.

Since the present invention may be variously changed and have various embodiments, particular embodiments will be exemplified and described in the drawings. However, it should be understood that the present invention is not limited to the particular embodiments and includes all changes, equivalents, and substitutes within the spirit and the scope of the present invention.

Further, it should be understood that, although the terms "second," "first," and the like may be used herein to describe various elements, the elements are not limited by the terms. The terms are only used to distinguish one element from another. For example, a first element may be termed a second element, and similarly, a second element may be termed a first element without departing from the scope of the present invention. The term "and/or" includes any one or any combination among a plurality of associated listed items.

When predetermined components are mentioned as being "linked," or "connected" to other components, the components may be directly linked or connected to other components, but it should be understood that additional components may be present therebetween. On the other hand, when the predetermined components are mentioned as being "directly linked," or "directly connected" to other components, it should be understood that no additional components are present between the above-described components.

Terms used in the present application are used solely to describe the particular embodiments and not to limit the present invention. The singular form is intended to also include the plural form, unless the context clearly indicates otherwise. It should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

Unless otherwise defined, all terms including technical or scientific terms used in the present application have meanings which are the same as those of terms generally understood by those skilled in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawing drawings, the same reference numerals are applied to the same or corresponding elements, and redundant description thereof will be omitted.

Figure 2:
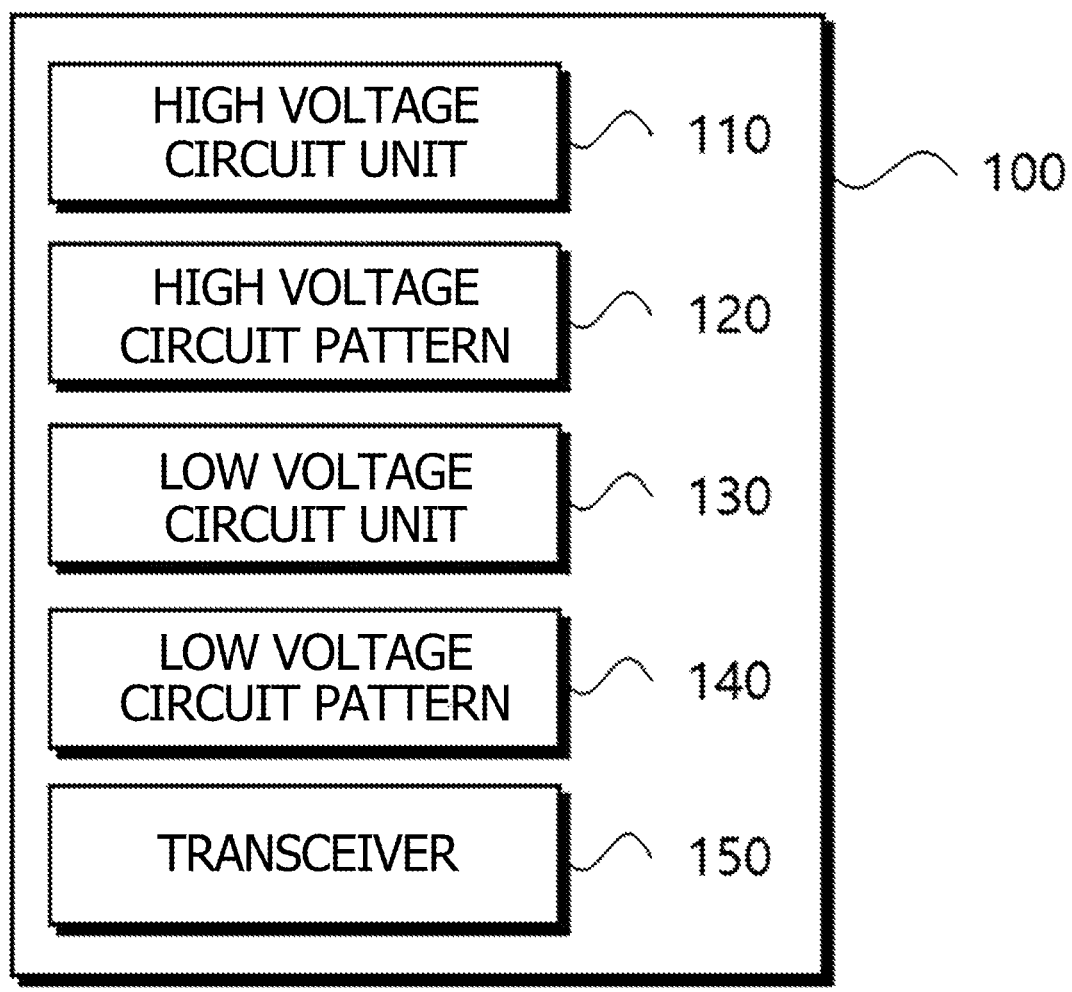
FIG. 2 is a configuration diagram of an inverter module according to an embodiment of the present invention.

FIG. 2 is a configuration diagram of an inverter module according to an embodiment of the present invention.

The inverter module according to the embodiment of the present invention may be a device disposed in a vehicle to supply power to various components such as a vehicle air conditioner, but is not limited thereto.

Referring to FIG. 2, an inverter module 100 according to the embodiment of the present invention may include a high voltage circuit unit 110, a high voltage circuit pattern 120, a low voltage circuit unit 130, and a low voltage circuit unit 140 and may further include an insulating element 150.

The high voltage circuit unit 110 generates an inverter control voltage and a motor driving voltage using a first direct current (DC) voltage. Specifically, the high voltage circuit unit 110 may generate the motor driving voltage and the inverter control voltage for generating the motor driving voltage using the first DC voltage applied from an external power source. Here, the external power source means a power source which supplies power from the outside of the inverter module. For example, the external power source may be a battery included in a vehicle. The high voltage circuit unit 110 may receive the first DC voltage and include a plurality of elements for generating the motor driving voltage and the inverter control voltage. The plurality of elements may be grouped by function of the high voltage circuit unit 110. Further, the first DC voltage may mean a high voltage applied to the inverter module 100. The first DC voltage may be a voltage greater than 15 [V].

The high voltage circuit pattern 120 electrically connects the high voltage circuit unit 110. Specifically, the high voltage circuit pattern 120 may electrically connect the plurality of elements included in the high voltage circuit unit 110 so that the high voltage circuit unit 110 performs a function. The high voltage circuit pattern 120 may be implemented in a shape printed on a board.

The low voltage circuit unit 130 communicates with an external device using a second DC voltage. Here, the external device may refer to a device disposed at the outside of the inverter module. For example, the external device may be an on-board diagnostics (OBD) module mounted in a vehicle. The low voltage circuit unit 130 may receive the second DC voltage and include a plurality of elements for performing communication with the external device. The plurality of elements may be grouped by function of the low voltage circuit unit 130. Further, the second DC voltage may mean a low voltage applied to the inverter module 100. The second DC voltage may be smaller in magnitude than the first DC voltage. The second DC voltage may be a voltage of 12 [V].

Next, the low voltage circuit pattern 140 electrically connects the low voltage circuit unit 130. Specifically, the low voltage circuit pattern 140 may electrically connect the plurality of elements included in the low voltage circuit unit 130 so that the low voltage circuit unit 130 performs a function. The low voltage circuit pattern 140 may be implemented in a shape printed on a board.

Next, a transceiver 150 may transmit a signal between the high voltage circuit unit 110 and the low voltage circuit unit 130. In this case, the transceiver 150 may be implemented as an insulating element so that electricity does not flow between the high voltage circuit unit 110 and the low voltage circuit unit 130. For example, the transceiver 150 may include an opto-coupler or a photo coupler. Accordingly, the inverter module according to the embodiment of the present invention may prevent a coupling noise generated between the high voltage circuit unit 110 and the low voltage circuit unit 130.

Figure 3:
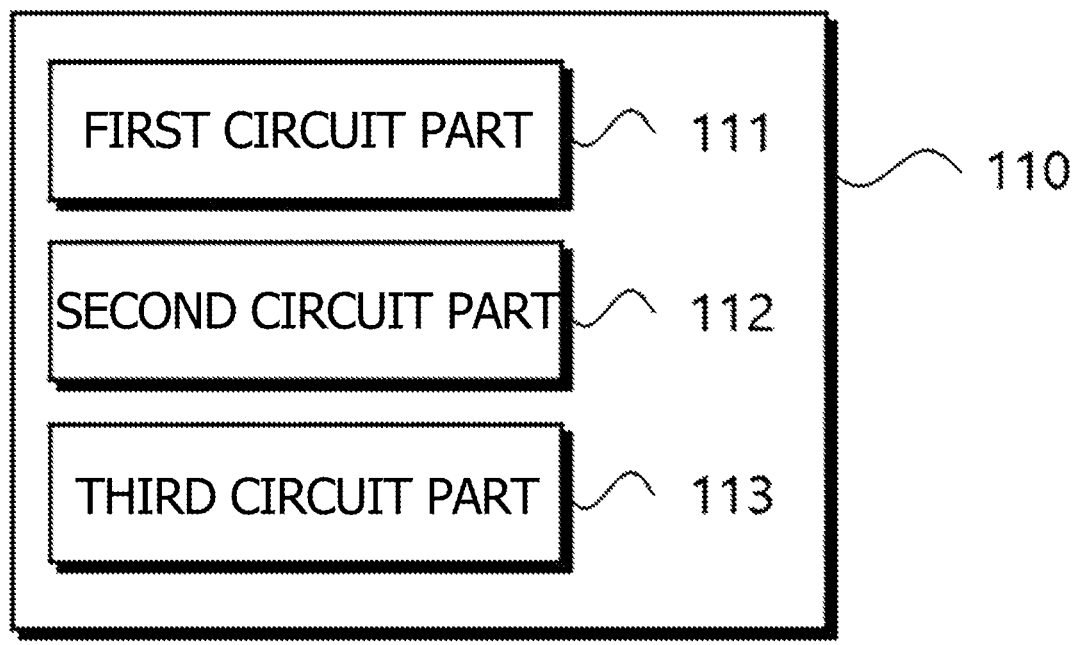
FIG. 3 is a configuration diagram of a high voltage circuit unit according to the embodiment of the present invention.

FIG. 3 is a configuration diagram of the high voltage circuit unit according to the embodiment of the present invention.

As shown in FIG. 3, the high voltage circuit unit 110 according to the embodiment of the present invention may include a first circuit part 111, a second circuit part 112, and a third circuit part 113. The first circuit part 111, the second circuit part 112, and the third circuit part 113 may be classified according to the magnitude of the applied voltage.

First, the first circuit part 111 may realize a predetermined function using the first DC voltage as an input voltage. The first circuit part 111 may generate a motor driving voltage and a third DC voltage through the first DC voltage. To this end, the first circuit part 111 may include a first switching mode power supply (SMPS) and a plurality of switching elements.

Specifically, the first SMPS generates the third DC voltage smaller than the first DC voltage through the first DC voltage. In this case, the first SMPS may be a circuit including a switching transistor and the like. The first SMPS may generate the third DC voltage through the first DC voltage by controlling a ratio of an ON-OFF time of a semiconductor switching transistor. Here, the third DC voltage may be a voltage of 15 [V]. The generated third DC voltage is applied to the second circuit part 112.

Next, the plurality of switching elements convert the first DC voltage into the motor driving voltage through switching driving. In this case, a motor which receives the motor driving voltage may be a three-phase motor. Accordingly, the motor driving voltage may be a three-phase AC voltage. The plurality of switching elements may be implemented as at least one of an insulated gate bipolar transistor (IGBT) and a metal oxide semiconductor field effect transistor (MOSFET). For example, the plurality of switching elements may be implemented as six switching elements. When the plurality of switching elements are implemented as six switching elements, since one of three switching elements connected to a high side is turned on and one of three switching elements connected to a low side is turned on, the first DC voltage is converted to the motor driving voltage. In this case, when the switches of the same phase are simultaneously turned on, since a voltage is not applied to the motor, the switches located in different phases may be turned on. Like the above, the plurality of switching elements may be repeatedly turned on and turned off according to a predetermined rule to generate the motor driving voltage.

The second circuit part 112 may realize a predetermined function using the third DC voltage as an input voltage. The second circuit part 112 may generate a fourth DC voltage and control a switching element of the first circuit part 111. To this end, the second circuit part 112 may include a second SMPS and a gate driver.

Specifically, the second SMPS generates the fourth DC voltage smaller than the third DC voltage through the third DC voltage. In this case, the second SMPS may be a circuit including a switching transistor and the like and may generate the fourth DC voltage through the third DC voltage by controlling a ratio of an ON-OFF time of a semiconductor switching transistor. Here, the fourth DC voltage may be a voltage of 3.3 [V]. The generated fourth DC voltage is applied to the third circuit part 113.

Next, the gate driver controls a plurality of switching elements through the third DC voltage. The gate driver may include a first gate driver which controls the plurality of switching elements connected to a high side and a second gate driver which controls the plurality of switching elements connected to a low side. The first gate driver and the second gate driver may generate a gate control signal through the third DC voltage and transmit the gate control signal to the plurality of switching elements included in the first circuit part 111. Accordingly, an on-off operation of the plurality of switching elements may be controlled according to the gate control signal.

The third circuit part 113 may realize a predetermined function using the fourth DC voltage as an input voltage. The third circuit part 113 may control the gate driver included in the second circuit part 112 and communicate with the low voltage circuit unit 130. To this end, the third circuit part 113 may include a processor.

The processor may control the gate driver through the fourth DC voltage and communicate with the low voltage circuit unit 130. The processor may be a digital signal processor (DSP) implemented as an integrated circuit (IC) chip.

Figure 4:
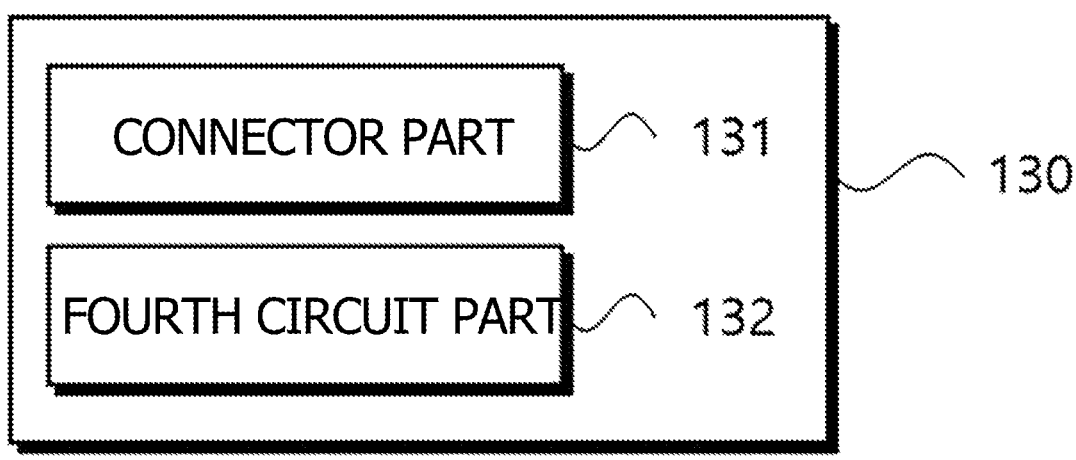
FIG. 4 is a configuration diagram of a low voltage circuit unit according to the embodiment of the present invention.

FIG. 4 is a configuration diagram of the low voltage circuit unit according to the embodiment of the present invention.

The low voltage circuit unit 130 according to the embodiment of the present invention may include a connector part 131 and a fourth circuit part 132.

The connector part 131 receives the second DC voltage. The connector part 131 may be connected to an external power source, which supplies the second DC voltage, through a cable.

The fourth circuit part 132 communicates with an external device through the second DC voltage. In addition, the fourth circuit part 132 may communicate with the high voltage circuit unit 110. Specifically, the fourth circuit part 132 may communicate with the processor included in the third circuit part 113. To this end, the fourth circuit part 132 may include a communication element. For example, the fourth circuit part 132 may include a communication element such as a controller area network (CAN) communication device or a communication microcomputer.

Figure 5:
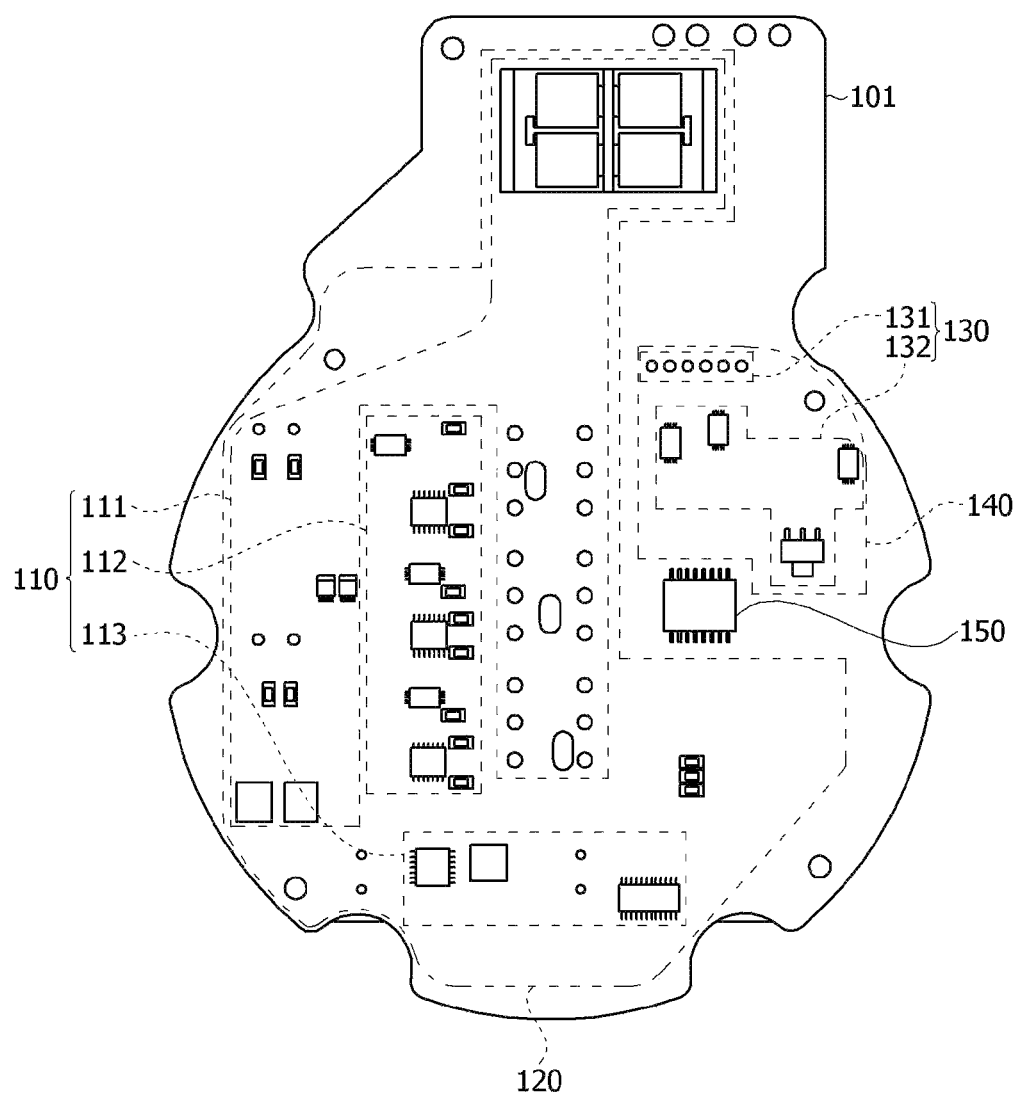
FIG. 5 is a view illustrating the inverter module according to the embodiment of the present invention.

FIG. 5 is a view illustrating the inverter module according to the embodiment of the present invention.

Referring to FIG. 5, the high voltage circuit pattern 120 and the low voltage circuit pattern 130 may be printed on a board. A region of the high voltage circuit pattern 120 and a region of the low voltage circuit pattern 130 printed on the board are disposed to be spaced apart from each other and separated from each other. That is, the high voltage circuit pattern 120 and the low voltage circuit pattern 130 may not be electrically connected to each other.

The first circuit part 111, the second circuit part 112, and the third circuit part 113 included in the high voltage circuit unit 110 are disposed on the high voltage circuit pattern 120. Accordingly, the first circuit part 111, the second circuit part 112, and the third circuit part 113 may be electrically connected by the high voltage circuit pattern 120.

The connector part 131 and the fourth circuit part 132 included in the low voltage circuit unit 130 are disposed on the low voltage circuit pattern 140. Accordingly, the connector part 131 and the fourth circuit part 132 may be electrically connected by the low voltage circuit pattern 140.

An arrangement structure of the high voltage circuit unit 110 will be specifically examined.

As shown in FIG. 5, the first circuit part 111, the second circuit part 112, and the third circuit part 113 are disposed to be spaced apart from each other. In this case, a separation interval may vary depending on a size of a board 101 and the like. The first circuit part 111 may be disposed adjacent to the second circuit part 112, and the second circuit part 112 may be disposed adjacent to the third circuit part 113. The first circuit part 111 may be electrically connected to the second circuit part 112, and the second circuit part 112 may be electrically connected to the third circuit part 113. This electrical connection may be implemented by the high voltage circuit pattern 120.

The plurality of elements constituting the second circuit part 112 may be sequentially disposed along a first direction. That is, the second SMPS and the gate driver of the second circuit part 112 may be sequentially disposed along the first direction. Since the elements included in the second circuit part 112 are sequentially disposed along the first direction, the second circuit part 112 may have a shape extending in the first direction. Accordingly, the first direction may be a longitudinal direction of the second circuit part 112 shown in FIG. 5.

The plurality of elements constituting the third circuit part 113 may be sequentially disposed along a second direction. That is, the processor of the third circuit part 113 and other elements to which the fourth DC voltage is supplied may be sequentially disposed along the second direction. Since the elements included in the third circuit part 113 are sequentially disposed along the second direction, the third circuit part 113 may have a shape extending in the second direction. Accordingly, the second direction may be a longitudinal direction of the third circuit part 113 shown in FIG. 5.

The first direction and the second direction may form a predetermined angle with each other. For example, as shown in FIG. 5, the first direction and the second direction may form an angle of 90 degrees with each other. However, the above is an example and the present invention is not limited thereto. However, the predetermined angle may be designed based on the structure of the inverter module 110 so that one end of the second circuit part 112 and one end of the third circuit part 113 become as far away as possible. For example, a lower end of the second circuit part 112 and a left side end of the third circuit part 113 may be electrically connected to each other so that the third DC voltage can be transmitted. The plurality of elements constituting the third circuit part 113 are disposed from the left side end to the right side end, that is, along the second direction, and the plurality of elements sequentially disposed may be disposed to be far away from the second circuit part 112 from the left side end to the right side end. Accordingly, noise coupling which occurs between the second circuit part 112 and the third circuit part 113, that is, a coupling noise, may be minimized.

Further, the connector part 131 is disposed to be adjacent to and spaced apart from one side of the fourth circuit part 132. In this case, a separation interval may be set in consideration of the size of the board 101.

An arrangement structure of the low voltage circuit unit 130 will be specifically examined.

Figure 6:
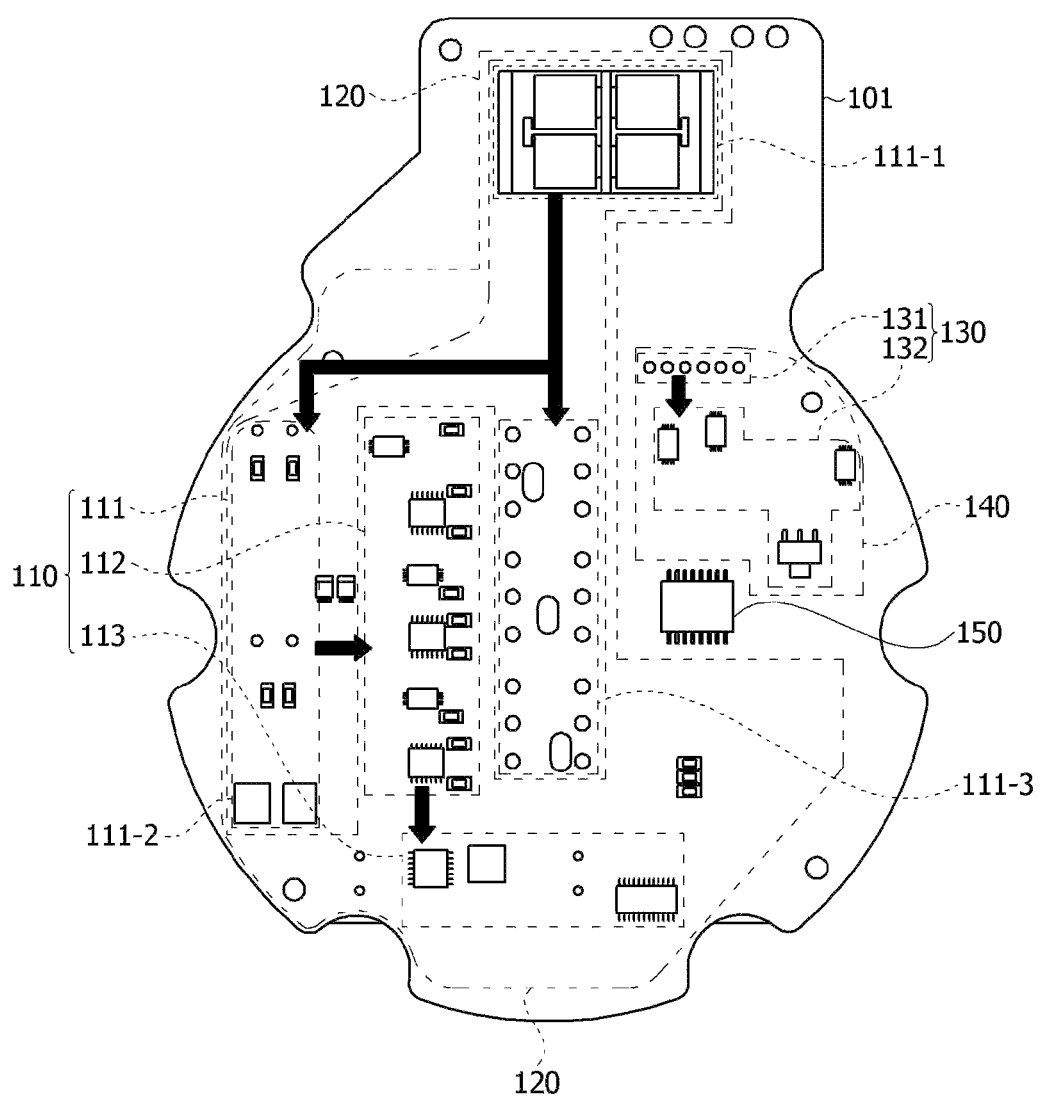
FIG. 6 is a view for describing a voltage supply flow of the inverter module according to the embodiment of the present invention.

FIG. 6 is a view for describing a voltage supply flow of the inverter module according to the embodiment of the present invention.

An arrow shown in FIG. 6 indicates a current flow direction.

Referring to FIG. 6, when a power storage element 111-1 of the high voltage circuit unit 110 receives the first DC voltage from an external power source, the first DC voltage is applied to each of a first SMPS 111-2 and a switching element 111-3. The switching element 111-3 generates the motor driving voltage through the switching driving and supplies the generated motor driving voltage to the motor. Accordingly, the switching element 111-3 may be connected to the motor. Further, the first SMPS 111-2 converts the first DC voltage to the third DC voltage and supplies the third DC voltage to the second circuit part 112. Accordingly, the second circuit part 112 generates the fourth DC voltage through the third DC voltage and supplies the fourth DC voltage to the third circuit part 113. Further, the connector part 131 of the low voltage circuit unit 130 receives the second DC voltage and then supplies the second DC voltage to the fourth circuit part 132. That is, the first circuit part 111, the second circuit part 112, and the third circuit part 113 may be sequentially disposed depending on a current direction when during inverter driving.

Looking at the current direction shown in FIG. 6 according to DC voltage supply, since the high voltage circuit pattern 120 in which the high voltage circuit unit 110 is disposed and the low voltage circuit pattern 140 in which the low voltage circuit unit 130 is disposed do not overlap each other, it can be seen that current flows flowing through the high voltage circuit unit 110 and the low voltage circuit unit 130 do not overlap each other. Accordingly, the coupling noise generated between the current flowing through the low voltage circuit unit 130 and the current flowing through the high voltage circuit unit 110 may be significantly reduced.

Further, it can be seen that one side through which current flows and the other side opposite the one side between the second circuit part 112 and the third circuit part 113 are disposed to have a large interval therebetween. Accordingly, the coupling noise generated between the second circuit part 112 and the third circuit part 113 may be significantly reduced.

Further, since the connector part 131 and the fourth circuit part 132 are disposed adjacent to each other, the coupling noise generated by current movement may be significantly reduced.

Meanwhile, the inverter module according to the embodiment of the present invention may be provided in an electric compressor. The electric compressor includes the inverter module according to the embodiment of the present invention and may include a housing, a drive motor, and a compression part. The electric compressor supplies power to the driving motor through the inverter module according to the embodiment of the present invention, the driving motor transfers a rotational driving force to the compression part, and the compression part compresses a refrigerant through the rotational driving force.

The housing forms an exterior of the electric compressor. A space in which a component may be mounted may be formed in the housing. For example, the housing may be implemented in a cylindrical shape having a through hole in a center thereof but is not limited thereto. The driving motor may be provided on one side of the inside of the housing, and the compression part may be provided on the other side of the inside of the housing.

The driving motor generates a rotational driving force. The driving motor may include a stator and a rotor. A rotary shaft may be coupled to the rotor. The stator is a type of an electromagnet and may be fixedly installed in the housing by press-fitting. The stator may be formed of a stator core and a bundle of coils wound around the stator core but is not limited thereto. The rotor is installed at an inner side of the stator coaxially with the stator. The rotating shaft may be installed to be rotated in association with the rotor.

The compression unit may compress the refrigerant by receiving the rotational driving force of the driving motor. The compression unit may include a fixed scroll and an orbiting scroll. The fixed scroll is fixedly installed in the compressor housing. The orbiting scroll may gradually compress a refrigerant compression space formed between the fixed scroll and the orbiting scroll while rotating together with the rotor in the state of being coupled to a part of the rotary shaft. That is, the refrigerant introduced into the compression space is compressed by relative rotation of the fixed scroll and the orbiting scroll.

Although the above-described embodiments are mainly described with reference to the embodiments of the present invention, the above are only exemplary, and it should be understood that those skilled in the art may variously perform modifications and applications within the principle of the embodiments. For example, elements specifically shown in the embodiments may be modified. Further, differences related to modifications and changes should be understood as being included in the scope of the present invention defined in the appended claims.

The invention claimed is:

1. An inverter module comprising:
a high voltage circuit unit configured to generate an inverter control voltage and a motor driving voltage using a first direct current (DC) voltage;
a high voltage circuit pattern configured to electrically connect the high voltage circuit unit;
a low voltage circuit unit configured to communicate with an external device using a second DC voltage having a smaller magnitude than the first DC voltage; and
a low voltage circuit pattern configured to electrically connect the low voltage circuit unit,
wherein the high voltage circuit pattern and the low voltage circuit pattern are disposed to be spaced apart from each other, and the high voltage circuit unit includes a first circuit part driven through the first DC voltage, a second circuit part driven through a third DC voltage having a smaller magnitude than the first DC voltage, and a third circuit part driven through a fourth DC voltage having a smaller magnitude than the third DC voltage.

2. The inverter module of claim 1, wherein:
the high voltage circuit pattern and the low voltage circuit pattern are printed on a board; and
a region where the high voltage circuit pattern is printed and a region where the low voltage circuit pattern is printed are separated from each other on the board.

3. The inverter module of claim 1, wherein the first circuit part includes a first switching mode power supply (SMPS) which generates the third DC voltage with the first DC voltage, and a plurality of switching elements configured to convert the first DC voltage to the motor driving voltage through switching driving.

4. The inverter module of claim 3, wherein the second circuit part includes a second SMPS which generates the fourth DC voltage with the third DC voltage, and a gate driver configured to control the plurality of switching elements through the third DC voltage.

5. The inverter module of claim 4, wherein the third circuit part includes a processor configured to control the gate driver through the fourth DC voltage and communicate with the low voltage circuit unit.

6. The inverter module of claim 1, wherein the first circuit part, the second circuit part, and the third circuit part are disposed on the high voltage circuit pattern.

7. The inverter module of claim 6, wherein the first circuit part, the second circuit part, and the third circuit part are sequentially disposed according to a current direction during inverter driving.

8. The inverter module of claim 7, wherein:
a plurality of elements constituting the second circuit part are sequentially disposed along a first direction; and
a plurality of elements constituting the third circuit part are sequentially disposed along a second direction forming a predetermined angle with the first direction.

9. The inverter module of claim 8, wherein the plurality of elements constituting the third circuit part are sequentially disposed to become farther away from the second circuit part along the second direction.

10. An inverter module comprising:
a high voltage circuit unit configured to generate an inverter control voltage and a motor driving voltage using a first direct current (DC) voltage;
a high voltage circuit pattern configured to electrically connect the high voltage circuit unit;
a low voltage circuit unit configured to communicate with an external device using a second DC voltage having a smaller magnitude than the first DC voltage; and
a low voltage circuit pattern configured to electrically connect the low voltage circuit unit,
wherein the high voltage circuit pattern and the low voltage circuit pattern are disposed to be spaced apart from each other, and
wherein the low voltage circuit unit includes a connector part is configured to receive the second DC voltage, and a fourth circuit part is configured to communicate with the external device through the second DC voltage.

11. The inverter module of claim 10, wherein the connector part and the fourth circuit part are disposed on the low voltage circuit pattern.

12. The inverter module of claim 10, wherein the connector part and the fourth circuit part are disposed to be spaced apart from each other; and
the high voltage circuit pattern is disposed not to cross between the connector part and the fourth circuit part.

13. An inverter module comprising:
a high voltage circuit unit configured to generate an inverter control voltage and a motor driving voltage using a first direct current (DC) voltage;
a high voltage circuit pattern configured to electrically connect the high voltage circuit unit;
a low voltage circuit unit configured to communicate with an external device using a second DC voltage having a smaller magnitude than the first DC voltage; and
a low voltage circuit pattern configured to electrically connect the low voltage circuit unit,
wherein the high voltage circuit pattern and the low voltage circuit pattern are disposed to be spaced apart from each other and further comprising a transceiver configured to transmit a signal between the high voltage circuit unit and the low voltage circuit unit.

14. The inverter module of claim 13, wherein the transceiver includes an insulating element configured to insulate the high voltage circuit unit and the low voltage circuit unit.

15. An electric compressor including the inverter module of claim 1.

16. An electric compressor including the inverter module of claim 2.

17. An electric compressor including the inverter module of claim 3.

18. An electric compressor including the inverter module of claim 4.

* * * * *